United States Patent [19]

Aulich et al.

[11] 4,251,250
[45] Feb. 17, 1981

[54] PROCESS AND APPARATUS FOR THE PRODUCTION OF LIGHT CONDUCTING FIBERS

[75] Inventors: Hubert Aulich, Munich; Karl-Heinz Eisenrith, Schliersee, both of Fed. Rep. of Germany

[73] Assignee: Siemens Aktiengesellschaft, Berlin & Munich, Fed. Rep. of Germany

[21] Appl. No.: 67,959

[22] Filed: Aug. 20, 1979

[30] Foreign Application Priority Data

Sep. 29, 1978 [DE] Fed. Rep. of Germany ....... 2842586

[51] Int. Cl.³ .................. C03C 25/02; C03B 37/02
[52] U.S. Cl. ............................................. 65/2; 65/3 C; 65/11 W; 65/32
[58] Field of Search ............... 65/1, 2, 3 A, 3 C, 13, 65/11 W, 18, 32

[56] References Cited

U.S. PATENT DOCUMENTS

| 4,032,313 | 6/1977 | Tokuhara ................................. 65/1 |
| 4,118,212 | 10/1978 | Aulich et al. ...................... 65/3 A |
| 4,133,664 | 1/1979 | Aulich et al. ...................... 65/3 A |
| 4,193,782 | 3/1980 | Aulich et al. ...................... 65/11 R |

FOREIGN PATENT DOCUMENTS 2734152  2/1979  Fed. Rep. of Germany .
49-5722  2/1974  Japan .

OTHER PUBLICATIONS

Preparation and Properties of Low-Loss Optical Fibers with a Fused Silica Core and Plastic Cladding, Grabmaier et al., Siemens-Forsch-u. Entwickl Ber. Bd., 6 (7/1977), No. 5.
Preparation of Optical Fibers of High Tensile Strength, Aulich et al., Siemens-Forsch-u. Entwickl-Ber. Bd 7 3, 1978, No. 3.

*Primary Examiner*—Robert L. Lindsay, Jr.
*Attorney, Agent, or Firm*—Hill, Van Santen, Steadman, Chiara & Simpson

[57] ABSTRACT

A process and apparatus for producing light conducting fibers characterized by introducing multi-component glasses into a quartz glass crucible, melting the multi-component glasses, homogenizing and refining the melt, subsequently drawing the glass fiber through an opening in the base of the quartz crystal and then coating the fiber with an optically active synthetic material. During the homogenizing and refining of the melt, gas, such as dry oxygen, is introduced and passed through the melt. So that fibers of any length can be drawn, additional glass material in the form of premanufactured, highly pure glass rods are introduced into the crucible as necessary.

14 Claims, 1 Drawing Figure

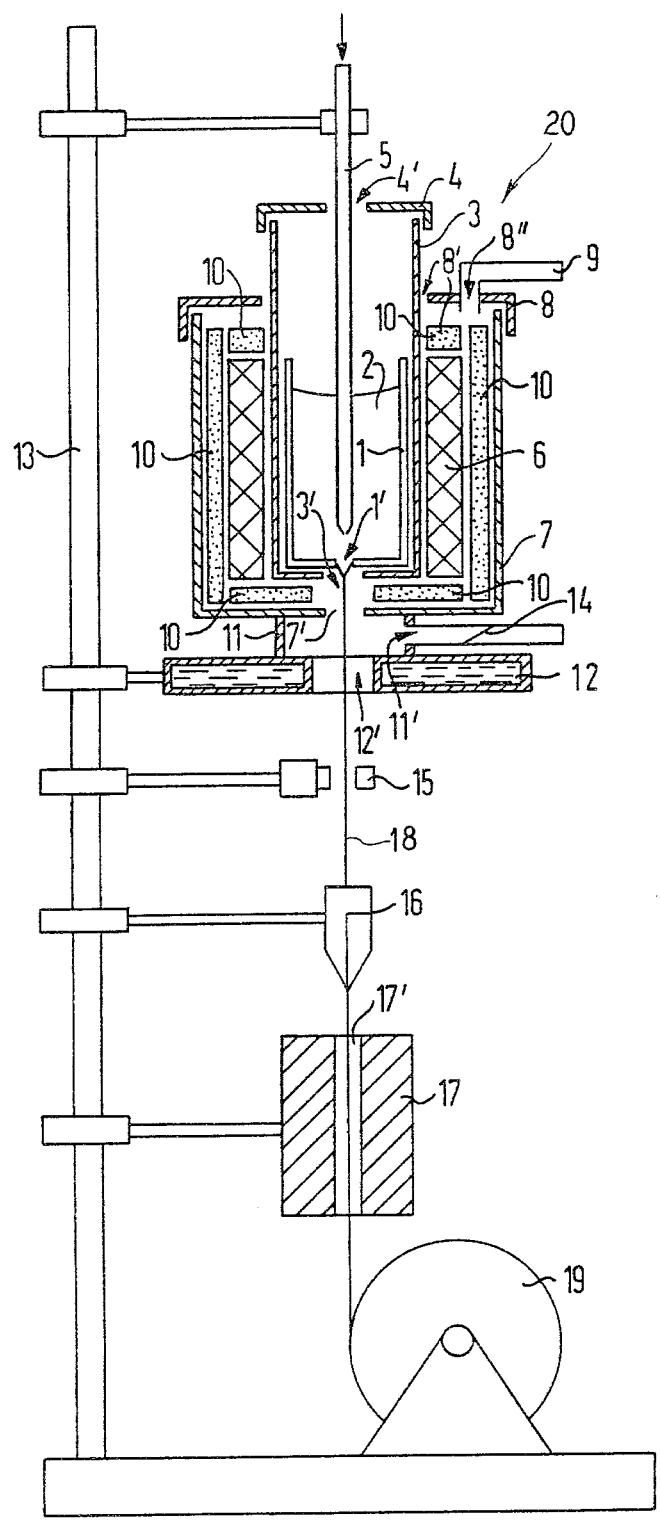

PROCESS AND APPARATUS FOR THE PRODUCTION OF LIGHT CONDUCTING FIBERS

BACKGROUND OF THE INVENTION

The present invention is directed to a process and apparatus for the production of light conducting fibers which have a low degree of attenuation and a high numerical aperture. The glass fiber is coated with an optically active synthetic casing or cladding.

Low attenuation light conducting fibers having a high numerical aperture are currently produced by a glass, plastic process in which commercially available quartz glass rods are drawn to form fibers at a temperature of approximately 2000° C. and are then coated after drawing with an optically active synthetic casing material which generally consists of polysiloxane. A discussion of these methods are contained in an article by J. G. Grabmaier et al, "Preparation and Properties of Low-Loss Optical Fibers with Fused-Silica Core and Plastic Cladding", Siemens Forschungs-und Entwicklungsbereicht, Vol. 6, No. 5, 1977, pp. 314–319. The use of an extremely pure quartz glass rod as a fiber core material means that these fibers are relatively expensive and furthermore can only be produced in a specific length which is dependent upon the size of the rod. Thus, the process is a discontinuous process. Furthermore, during the fiber drawing process, particles of dust and dirt can pass from the heating zone to the quartz glass rod and to the fiber surface with the result of which the tensile strength of the fiber is considerably reduced and attenuation is increased. A discussion of these problems is contained in an article by H. Aulich et al, "Preparation of Optical Fibers of High Tensile Strength", Siemens Forschungs-und Entwicklungsbereicht, Vol. 7, No. 3, 1978, pp. 158–165.

SUMMARY OF THE INVENTION

The present invention is to provide a process and apparatus for producing a light conductor fiber having a low degree of attenuation and a high numerical aperture which fiber is coated with an optically active synthetic cladding material. The process produces fibers with a high tensile strength and low attenuation and the process enables continuously drawing fibers of arbitrary lengths.

To accomplish these tasks, the present invention is directed to a process for the production of light conducting fibers having a low degree of attenuation and a high numerical aperture, said light conducting fiber being a glass fiber having a cladding of optically active synthetic material, the process comprises the steps of introducing multi-component glasses into a quartz glass crucible, said glasses having a melting point well below the melting point of the crucible, melting the multi-component glasses, homogenizing and refining the melt to multi-component glasses, drawing a glass fiber through an opening in a base of the quartz crucible and during the drawing of the glass fiber, coating the fiber with an optically active synthetic material to produce the cladding of optically active synthetic material.

The use of the quartz glass crucible substantially avoids alien substance from penetrating into the glass melt of the fiber either from the crucible wall or from the exterior. Furthermore, as the fibers are drawn from a glass melt, no structural faults in the glass are transferred to the fiber which will occur when drawing the fiber from a rod of the material where structural faults in the glass rod can be transferred to the fiber drawn therefrom. As a result, a fiber drawn by the proposed process exhibits a high tensile strength and a low degree of attenuation.

If new glass material in the form of premanufactured, highly pure glass rods is subsequently introduced into the quartz glass crucible during the fiber drawing process, the proposed process can be used to produce fibers of any arbitrary length.

A crucible arrangement for the execution of the proposed process can be used for the premanufacture of the glass rods which are to be subsequently supplied. The proposed process can be used for producing light conducting fibers from multi-component glasses having a low degree of attenuation, a high numerical aperture and a high tensile strength which fibers are continuous in length and which process is cost favorable with relation to other known processes.

To accomplish the process, the process uses an apparatus which includes a quartz glass crucible arranged in a heating furnace, said crucible having an opening in the base thereof, a coating cell positioned beneath the opening of the base of the glass crucible, a drying furnace arranged beneath the coating cell and a drawing drum disposed beneath the drying furnace so that a fiber which is drawn through the opening of the crucible passes through the coating cell and the drying furnace to the drawing drum. Preferably, the glass crucible is arranged in a quartz glass container having a lid to enable maintaining a desired atmosphere in the crucible and means are provided for introducing gas into the melt for refining and homogenizing the melt. In addition to the first container, additional means surround the container for applying an atmosphere of a given quality and include means for applying a shield of gas on the fiber drawn from the crucible and means for cooling the fiber prior to reaching the coating cell.

BRIEF DESCRIPTION OF THE DRAWING

The FIGURE is a schematic cross-sectional view of an apparatus for forming the process of the present invention.

DESCRIPTION OF THE PREFERRED EMBODIMENT

The principles of the present invention are particularly useful in a method and apparatus which apparatus is generally indicated at 20 in the FIGURE. The apparatus includes a quartz glass crucible 1 which has an opening 1' in its base. A glass melt 2 is contained in the crucible, which is enclosed in a quartz glass container 3 having an opening 3' which is concentric with the opening 1' and has a larger diameter. The quartz glass container 3 is open at its top which opening is closed by a cover 4 composed of quartz glass. The cover 4 is also provided with an opening 4' through which a quartz glass tube 5 projects into the melt 2. The quartz glass container 3 is surrounded by a carbon susceptor 6 which serves for heating purposes.

All of the above mentioned parts are received in a second quartz glass container 7. The container 7 has an opening 7' which is concentric with the opening 1' but of a larger diameter. Also, the second quartz glass container 7 is open at the top which opening is closed by a lid or cover 8 which consists of quartz glass and possesses a first opening 8' through which a portion of the quartz glass container 3 projects. A knee-shaped tubular component 9, which consists of a quartz glass and through which a gas may be introduced extends through a second opening 8″ in the cover 8. Heat insulation material 10 is arranged in the space between the quartz glass containers 3 and 7 with the susceptor 6.

The second quartz container 7 forms means for maintaining an atmosphere around the first mentioned quartz container 3 and rests on a short tubular component 11 which is arranged with its axis extending along the axis of the openings 1′, 3′ and 7′. The tubular component 11 rests on a horizontally extending hollow ring 12, which is secured on a support 13. The tubular component 11 and an opening 12′ of the hollow ring 12 are concentric with the openings 1′ and the diameter of the opening 12′ is smaller than the inner diameter of the tube 11 which, in turn, is larger than the diameter of the opening 7′ of the outer quartz glass container 7. The walls of the tubular component 11 has an opening 11′ which receives a tubular component 14 for introducing gas into the tube 11 which gas acts as a shield gas around the fiber 18 being drawn through the tube 11 and opening 12′. Water is introduced for cooling purposes into the hollow ring 12, which consists of metal and in the radial cross section possesses a rectangular cross section.

Beneath the opening 12′ of the hollow ring 12 there is arranged a micrometer 15 which is secured to the support 13 and which continuously monitors the thickness of the drawing fiber. Since micrometers of this kind are generally known, a discussion of the details are not given. Beneath the micrometer 12 is arranged a coating cell 16, which is likewise secured to the support 13. A coating cell can be of the structure described in the copending U.S. Ser. No. 924,176 filed July 13, 1978 which was issued on Mar. 18, 1980 as United States Letters Pat. No. 4,193,782 and based on German application P 27 34 152.

Beneath the cell 13 a cylindrical drying furnace 17 is arranged and is likewise secured to the support 13. The cylindrical drying surface possesses a cylindrical opening 17′ whose axis is concentric with the axis of the opening 1′. Drying furnaces of this type are generally known and, therefore, it is only schematically illustrated in the drawing.

The glass fiber 18 is drawn out of the glass melt 2 through the opening 1′ and is conducted through the openings 12′ in the hollow ring 12, through the fiber micrometer 15, the cell 16 and the opening 17′ in the drying furnace 17 and is then secured to the surface of a drawing drum 19 which is arranged beneath the drying furnace 17. When the drawing drum 19 is rotated at a predetermined angular speed, a fiber 18 is continuously drawn out of the opening 1′ of the quartz glass crucible 1 and is coated with a synthetic material in the coating cell 16. A tube 5, which projects into the melt 2 and which is likewise secured to the frame 13 also serves to introduce gas into the melt.

The proposed process is now carried out in the following manner. The starting substances for the glass melt 2 are introduced in the quartz glass crucible 1 where they are melted at a temperature of 1200° C. The starting substances must melt at a lower temperature than the quartz glass of the crucible 1. Preferably, the starting substances are in powder or granular form and are induced in small portions, for example, in amounts of 50 grams and are carefully mixed. The addition of small batches into the quartz glass crucible 1, which is at a temperature of approximately 1200° C., shortens the homogenization time for the melt. The opening 1′ in the crucible base which has a typical diameter of 4–6 mm is sealed by a quartz glass rod during fusion process.

$Na_2CO_3$, $B_2O_3$ and $SiO_2$ are used as the starting substance for a sodium borosilicate glass. $Na_2CO_3$, $K_2CO_3$, PbO and $SiO_2$ are used as starting materials for production of an alkali-lead silicate glass.

The quartz glass container 3 protects the crucible 1 from impurities from the atmpshere and permits a controlled melting atmosphere.

Since iron has been established as the main impurity in the starting substances, the atmosphere consists of a dry oxygen, which is conducted through the tube 5 into and through the melt 2. A shield gas is introduced through the tubular components 9 and 14. The passage of the gas flow from tube 5 through the melt ensures that the absorption band of the dissolved iron is placed into the UV range and the light losses in the relevant wavelength band, which is from 800 nm to 900 nm, are kept low.

In addition to iron, water is also found to be particularly disturbing and enters the melt together with the hydroscopic boron oxide. The water content can be considerably reduced by using a dry gas flow to homogenize the melt, for example, a dry oxygen.

Following the homogenization phase, which lasts for several hours, and the subsequent refining phase, the sealing rod is removed and the fiber 18 is drawn downward at a temperature of approximately 800° C. at a speed of approximately 16 m/min. Having left the crucible 1, the fiber 18 passes through a coating cell 16 at which the fiber is coated with a casing of silicone resin. Then the fiber with the resin coating passes through the drying furnace 17 in which the resin is dried.

If during the fiber drawing process, new glass material is introduced in the form of highly pure glass rods, the proposed process can be used to produce fibers of any arbitrary length.

It should be noted that the same arrangement or apparatus which is used for drawing the fibers can be used to produce a highly pured glass rod. In such a case, it is merely necessary to use a considerably slower drawing speed, for example, a few cm per minute.

Although various minor modifications may be suggested by those versed in the art, it should be understood that we wish to embody within the scope of the patent granted hereon, all such modifications as reasonably and properly come within the scope of our contribution to the art.

We claim:

1. A process for the production of a light conducting fiber having a low degree of attenuation and a high numerical aperture, said light conducting fiber being a glass fiber having a cladding of optically active synthetic material the process comprising the steps of introducing multi-component glasses into a quartz glass crucible, said glasses having a melting point below the melting point of the crucible, melting the multi-component glasses, homogenizing and refining the melt of multi-component glasses by passing a gas through the glass melt in the quartz crucible, drawing a glass fiber through an opening in a base of the quartz crucible, during the drawing of the glass fiber providing a protective gas atmosphere surrounding the drawn glass fiber, cooling the fibers while in said atmosphere, and then coating the cooled, drawn fiber with an optically active synthetic material to produce the cladding of optically active material.

2. A process according to claim 1, wherein the step of drawing is accomplished by utilizing a drawing drum.

3. The process according to claim 1, wherein the step of coating is accomplished by passing the newly drawn and cooled fiber through a coating cell containing the material for the synthetic cladding.

4. A process according to claim 1, which includes subsequent to coating the newly drawn fiber, passing the coated fiber through a drying furnace.

5. The process according to claim 1, which further includes adding additional glass materials to the melt by introducing premanufactured, highly pure glass rods into the crucible.

6. An apparatus for providing a melt of glass, drawing the melt of glass into an optical fiber, coating the drawn fiber with a material, said apparatus including a quartz glass crucible arranged in a heating furnace, said crucible having an opening in a base thereof, means for introducing gas into the melt for refining and homogenizing the melt, a quartz glass container having a lid receiving the quartz glass crucible to enable maintaining a desired atmosphere in the crucible, additional means surrounding the container for applying an atmosphere of a given quantity and including means for applying a shield of gas in the fiber being drawn from the crucible, a coating cell positioned beneath the opening of the base of the glass crucible and beneath said means for applying a shield of gas, said additional means including means for cooling the fiber prior to reaching the coating cell, a drying furnace arranged beneath the coating cell and a drawing drum disposed beneath the drying furnace so that a fiber drawn through the opening of the crucible passes through the means for applying and the means for cooling them through the coating cell, the drying furnace and to the drawing drum.

7. The process according to claim 1, wherein the step of passing a gas passes a purified oxygen.

8. The process according to claim 7, wherein the step of passing pure oxygen passes a dry oxygen.

9. The process according to claim 1, wherein the step of passing a gas passes a dry gas into the melt.

10. A process according to claim 1, wherein the step of introducing comprises introducing the multi-component glasses as individual glass powders.

11. An apparatus according to claim 6, wherein a quartz glass tube extends into the crucible and is connected to said means for introducing gas into the melt.

12. An apparatus according to claim 6, wherein said additional means includes a quartz glass container.

13. An apparatus according to claim 12, wherein said means for cooling includes a hollow ring with water circulated therethrough.

14. An apparatus according to claim 6, wherein said means for cooling includes a hollow ring with water circulated therethrough.

* * * * *